United States Patent
Restauro

(10) Patent No.: US 6,558,016 B1
(45) Date of Patent: May 6, 2003

(54) MOTORCYCLIST GARMENT WITH ILLUMINATED TRAFFIC SIGNALS

(76) Inventor: Edward C. Restauro, 449 San Jose St., Fairfield, CA (US) 94533

( * ) Notice: Subject to any disclaimer, the term of this patent is extended or adjusted under 35 U.S.C. 154(b) by 0 days.

(21) Appl. No.: 09/904,762

(22) Filed: Jul. 13, 2001

(51) Int. Cl.[7] .............................................. F21V 21/08
(52) U.S. Cl. ...................... 362/103; 362/108; 362/800; 362/570; 362/540; 362/252; 340/468; 340/475; 340/479
(58) Field of Search ................................ 362/103, 108, 362/800, 486, 570, 252, 540, 549; 340/468, 475, 479, 478

(56) References Cited

U.S. PATENT DOCUMENTS

| | | |
|---|---|---|
| 4,164,008 A | 8/1979 | Miller et al. |
| D259,146 S | 5/1981 | Carr, Jr. |
| 4,328,533 A | 5/1982 | Paredes |
| 4,709,307 A * | 11/1987 | Branom ...................... 362/103 |
| 4,760,373 A | 7/1988 | Reilly |
| 5,040,099 A | 8/1991 | Harris |
| 5,910,764 A * | 6/1999 | Hayden ...................... 340/479 |
| 2002/0044052 A1 * | 4/2002 | Stewart ...................... 340/475 |

FOREIGN PATENT DOCUMENTS

GB        2 331 801 A   *   6/1999   ........... F21L/15/14

* cited by examiner

Primary Examiner—Sandra O'Shea
Assistant Examiner—Ronald E. DelGizzi

(57) ABSTRACT

A motorcyclist garment with illuminated traffic signals for providing better and more visible rear lighting for motorcyclists. The motorcyclist garment with illuminated traffic signals includes a garment having a back side, a neck opening, and arm openings; and further includes a light-emitting assembly including light-emitting members being disposed in the back side of said garment, and also including wires and a power cord being connected to the light-emitting members, and further including a connector plug being attached to an end of the power cord and being adapted to plug into a power jack of a motorcycle.

13 Claims, 2 Drawing Sheets

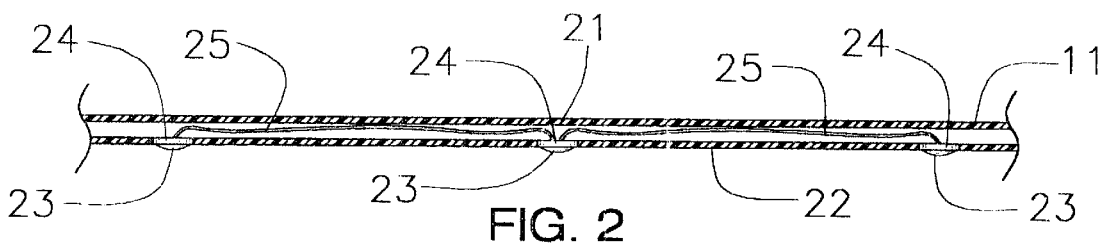
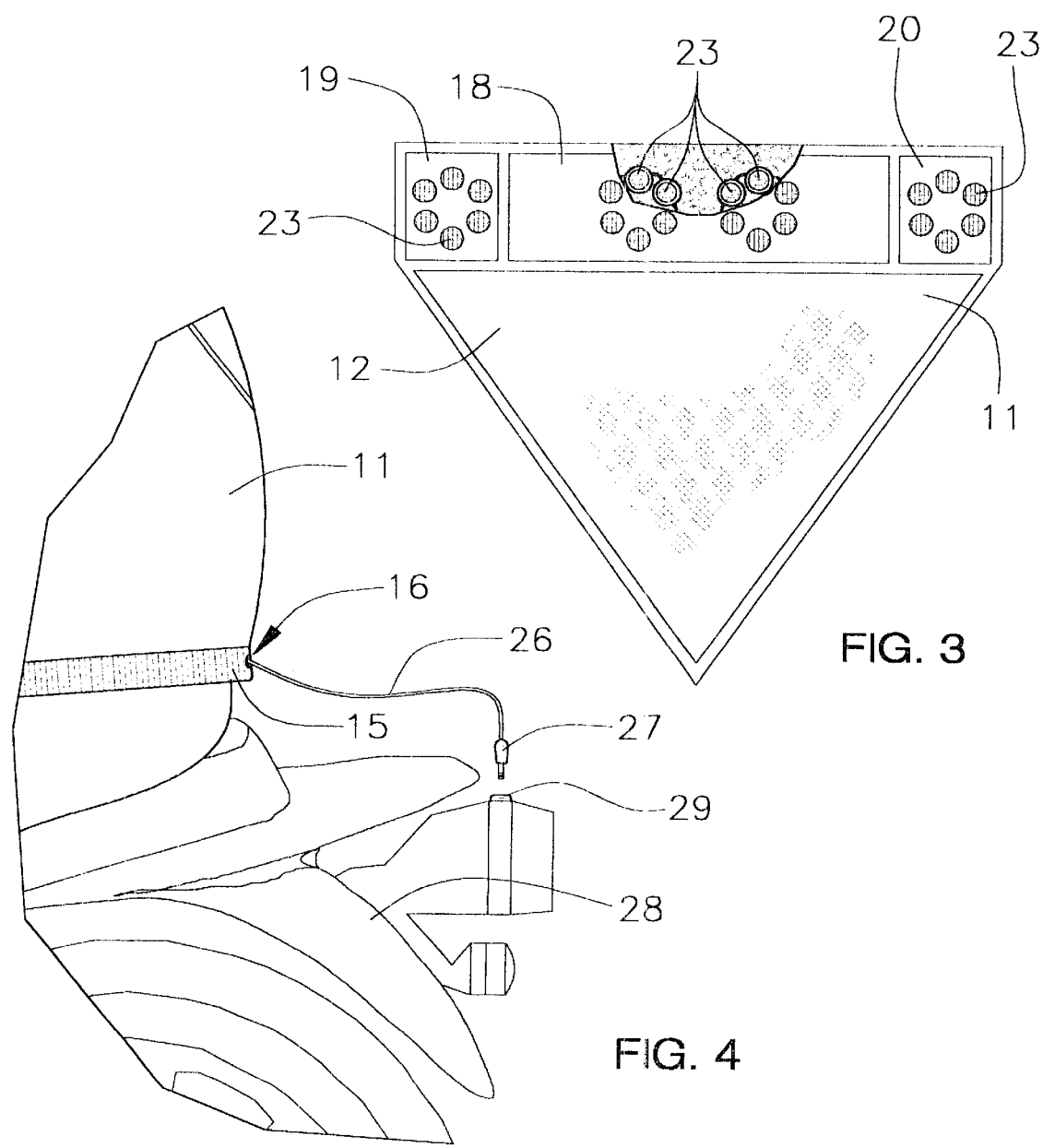

MOTORCYCLIST GARMENT WITH ILLUMINATED TRAFFIC SIGNALS

BACKGROUND OF THE INVENTION

1. Field of the Invention

The present invention relates to cyclist clothing with illuminated traffic signals and more particularly pertains to a new motorcyclist garment with illuminated traffic signals for providing better and more visible rear lighting for motorcyclists.

2. Description of the Prior Art

The use of cyclist clothing with illuminated traffic signals is known in the prior art. More specifically, cyclist clothing with illuminated traffic signals heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,709,307; 4,164,008; 4,760,373; 5,040,099; 4,328,533; and U.S. Pat. No. Des. 259,146.

While these devices fulfill their respective, particular objectives and requirements, the aforementioned patents do not disclose a new motorcyclist garment with illuminated traffic signals. The inventive device includes a garment having a back side, a neck opening, and arm openings; and further includes a light-emitting assembly including light-emitting members being disposed in the back side of said garment, and also including wires and a power cord being connected to the light-emitting members, and further including a connector plug being attached to an end of the power cord and being adapted to plug into a power jack of a motorcycle.

In these respects, the motorcyclist garment with illuminated traffic signals according to the present invention substantially departs from the conventional concepts and designs of the prior art, and in so doing provides an apparatus primarily developed for the purpose of providing better and more visible rear lighting for motorcyclists.

SUMMARY OF THE INVENTION

In view of the foregoing disadvantages inherent in the known types of cyclist clothing with illuminated traffic signals now present in the prior art, the present invention provides a new motorcyclist garment with illuminated traffic signals construction wherein the same can be utilized for providing better and more visible rear lighting for motorcyclists.

The general purpose of the present invention, which will be described subsequently in greater detail, is to provide a new motorcyclist garment with illuminated traffic signals which has many of the advantages of the cyclist clothing with illuminated traffic signals mentioned heretofore and many novel features that result in a new motorcyclist garment with illuminated traffic signals which is not anticipated, rendered obvious, suggested, or even implied by any of the prior art cyclist clothing with illuminated traffic signals, either alone or in any combination thereof.

To attain this, the present invention generally comprises a garment having a back side, a neck opening, and arm openings; and further includes a light-emitting assembly including light-emitting members being disposed in the back side of said garment, and also including wires and a power cord being connected to the light-emitting members, and further including a connector plug being attached to an end of the power cord and being adapted to plug into a power jack of a motorcycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motorcyclist garment with illuminated traffic signals which has many of the advantages of the cyclist clothing with illuminated traffic signals mentioned heretofore and many novel features that result in a new motorcyclist garment with illuminated traffic signals which is not anticipated, rendered obvious, suggested, or even implied by any of the prior art cyclist clothing with illuminated traffic signals, either alone or in any combination thereof.

It is another object of the present invention to provide a new motorcyclist garment with illuminated traffic signals which may be easily and efficiently manufactured and marketed.

It is a further object of the present invention to provide a new motorcyclist garment with illuminated traffic signals which is of a durable and reliable construction.

An even further object of the present invention is to provide a new motorcyclist garment with illuminated traffic signals which is susceptible of a low cost of manufacture with regard to both materials and labor, and which accordingly is then susceptible of low prices of sale to the consuming public, thereby making such motorcyclist garment with illuminated traffic signals economically available to the buying public.

Still yet another object of the present invention is to provide a new motorcyclist garment with illuminated traffic signals which provides in the apparatuses and methods of the prior art some of the advantages thereof, while simultaneously overcoming some of the disadvantages normally associated therewith.

Still another object of the present invention is to provide a new motorcyclist garment with illuminated traffic signals for providing better and more visible rear lighting for motorcyclists.

Yet another object of the present invention is to provide a new motorcyclist garment with illuminated traffic signals which includes a garment having a back side, a neck opening, and arm openings; and further includes a light-emitting assembly including light-emitting members being disposed in the back side of said garment, and also including wires and a power cord being connected to the light-emitting members, and further including a connector plug being attached to an end of the power cord and being adapted to plug into a power jack of a motorcycle.

Still yet another object of the present invention is to provide a new motorcyclist garment with illuminated traffic signals that is easy and convenient to use.

Even still another object of the present invention is to provide a new motorcyclist garment with illuminated traffic signals that dramatically increases safety for motorcycles by making motorcycles more visible for drivers of other vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a partial cross-sectional view of the garment of the present invention.

FIG. 3 is a cutaway partial rear elevational view of the garment of the present invention.

FIG. 4 is a partial side elevational view of the present invention shown in use.

DESCRIPTION OF THE PREFERRED EMBODIMENT

Figure 1:
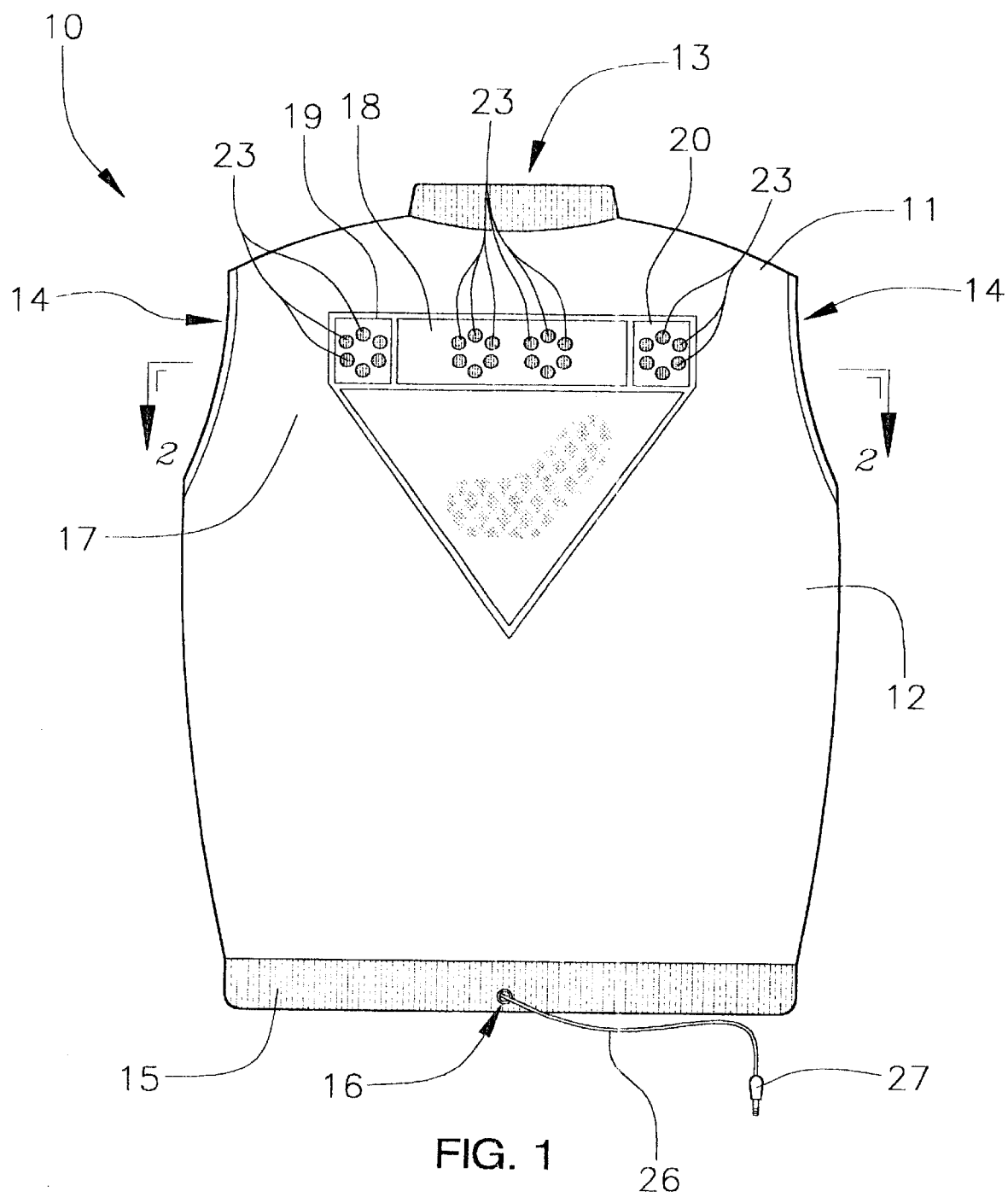
FIG. 1 is a rear elevational view of a new motorcyclist garment with illuminated traffic signals according to the present invention.

With reference now to the drawings, and in particular to FIGS. 1 through 4 thereof, a new motorcyclist garment with illuminated traffic signals embodying the principles and concepts of the present invention and generally designated by the reference numeral 10 will be described.

As best illustrated in FIGS. 1 through 4, the motorcyclist garment with illuminated traffic signals 10 generally comprises a garment 11 having a back side 12, a neck opening 13, and arm openings 14. The back side 12 of the garment 11 includes an inner layer of material 21 and an outer layer of material 22. The back side 12 of the garment 11 further includes an upper portion 17 having a central zone 18, a left zone 19, and a right zone 20.

A light-emitting assembly includes light-emitting members 23 being conventionally disposed in the back side 12 of the garment 11, and also includes wires 25 and a power cord 26 being conventionally connected to the light-emitting members 23, and further includes a connector plug 27 being conventionally attached to an end of the power cord 26 and being adapted to plug into a power jack 29 of a motorcycle 28. The light-emitting members 23 are conventionally disposed in the central, left, and right zones 1820. The light-emitting members 23 in the central zone 18 are illuminated upon a user engaging a brake of the motorcycle 28. The light-emitting members 23 in the left zone 19 are illuminated upon the user actuating a left turn signal of the motorcycle 28. The light-emitting members 23 in the right zone 20 are illuminated upon the user actuating a right turn signal of the motorcycle 28. The light-emitting assembly further includes a plurality of light sockets 24 being conventionally disposed in the outer layer of material 22 and in the central, left, and right zones 18–20. The light-emitting members 23 are removably disposed in the light sockets 24. The power cord 26 is extended between the inner and outer layers of material 21,22 and extends through a hole 16 in the garment 11 near a bottom edge 15 thereof.

In use, the user wears the garment 11, and connects the power cord 26 to a power jack 29 being connected to the signal lights of the motorcycle 28. As the user rides the motorcycle 20 upon the road, the light-emitting members 23 in the particular central, left, and right zones 18–20 will light up upon the user actuating the directional lights or engaging the brakes of the motorcycle 28 which makes it easier for drivers to see the motorcycle 28.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcyclist garment with illuminated traffic signals comprising:

a garment having a back side, a neck opening, and arm openings; and a light-emitting assembly including:

a plurality of light-emitting members being disposed in said back side of the garment, a first portion of said plurality of light-emitting members being disposed in a central zone on said back side of said garment, a second portion of said plurality of light-emitting members being disposed in a left zone on said back side of said garment, and a third portion of said plurality of light-emitting members being disposed in a right zone on said back side of said garment, said central zone of said back side of said garment being located between said left and right zones, and connector means for electrically connecting said light emitting members to a light system of a motorcycle for selectively illuminating the light-emitting members of one of said zones such that when a brake signal on the motorcycle is illuminated said first portion of said plurality of light-emitting members is illuminated, when a left turn signal on the motorcycle is illuminated said second portion of said plurality of light-emitting members is illuminated, and when a right turn signal on the motorcycle is illuminated said third portion of said plurality of light-emitting members is illuminated.

2. A motorcyclist garment with illuminated traffic signals as described in claim 1, wherein said back side of said garment includes an inner layer of material and an outer layer of material.

3. A motorcyclist garment with illuminated traffic signals as described in claim 1, wherein said back side of said garment further includes an upper portion, and said central zone, said left zone, and said right zone are located on said upper portion of said garment.

4. A motorcyclist garment with illuminated traffic signals as described in claim 1, wherein said connector means causes said light-emitting members in said central zone to be illuminated upon a user engaging a brake of the motorcycle, said light-emitting members in said left zone to be illuminated upon the user actuating a left turn signal of the motorcycle, and said light-emitting members in said right zone to be illuminated upon the user actuating a right turn signal of the motorcycle.

5. A motorcyclist garment with illuminated traffic signals as described in claim 1, wherein said light-emitting assembly further includes a plurality of light sockets being disposed in said central, left, and right zones, said light-emitting members being removably disposed in said light sockets.

6. A motorcyclist garment with illuminated traffic signals as described in claim 2, wherein said connecting means comprises a power cord extended between said inner and outer layers of material and extends through a hole in said garment near a bottom edge thereof.

7. A motorcyclist garment with illuminated traffic signals as described in claim 1, wherein said connector means comprises a power cord being connected to said light-emitting members, and a connector plug being attached to an end of said power cord and being adapted to plug into a power jack of the motorcycle.

8. A motorcyclist garment with illuminated traffic signals as described in claim 1, wherein the first portion of said plurality of light-emitting members has approximately twice as many of said light-emitting members as said second or third portions of said plurality of light-emitting members.

9. A motorcyclist garment with illuminated traffic signals as described in claim 1, wherein the light emitting members of said first portion of said plurality of light-emitting members are arranged in at least one circle.

10. A motorcyclist garment with illuminated traffic signals as described in claim 9, wherein said first portion of said plurality of light emitting members are arranged in a pair of circles.

11. A motorcyclist garment with illuminated traffic signals as described in claim 1, wherein the light emitting members of said second portion of said plurality of light-emitting members are arranged in a circle.

12. A motorcyclist garment with illuminated traffic signals as described in claim 1, wherein the light emitting members of said third portion of said plurality of light-emitting members are arranged in a circle.

13. A motorcyclist garment with illuminated traffic signals comprising:

a garment having a back side, a neck opening, and arm openings; and a light-emitting assembly including:

a plurality of light-emitting members being disposed in said back side of the garment, a first portion of said plurality of light-emitting members being disposed in a central zone on said back side of said garment, a second portion of said plurality of light-emitting members being disposed in a left zone on said back side of said garment, and a third portion of said plurality of light-emitting members being disposed in a right zone on said back side of said garment, said central zone of said back side of said garment being located between said left and right zones, and connector means for electrically connecting said light emitting members to a light system of a motorcycle for selectively illuminating the light-emitting members of one of said zones such that when a brake signal on the motorcycle is illuminated said first portion of said plurality of light-emitting members is illuminated, when a left turn signal on the motorcycle is illuminated said second portion of said plurality of light-emitting members is illuminated, and when a right turn signal on the motorcycle is illuminated said third portion of said plurality of light-emitting members is illuminated;

wherein said back side of said garment includes an inner layer of material and an outer layer of material;

wherein said back side of said garment further includes an upper portion, and said central zone, said left zone, and said right zone are located on said upper portion of said garment;

wherein said connector means causes said light-emitting members in said central zone to be illuminated upon a user engaging a brake of the motorcycle, said light-emitting members in said left zone to be illuminated upon the user actuating a left turn signal of the motorcycle, and said light-emitting members in said right zone to be illuminated upon the user actuating a right turn signal of the motorcycle;

wherein said light-emitting assembly further includes a plurality of light sockets being disposed in said central, left, and right zones, said light-emitting members being removably disposed in said light sockets;

wherein said connector means comprises a power cord being connected to said light-emitting members, and a connector plug being attached to an end of said power cord and being adapted to plug into a power jack of the motorcycle;

wherein the first portion of said plurality of light-emitting members has approximately twice as many of said light-emitting members as said second or third portions of said plurality of light-emitting members;

wherein said first portion of said plurality of light emitting members are arranged in a pair of circles;

wherein the light emitting members of said second portion of said plurality of light-emitting members are arranged in a circle; and wherein the light emitting members of said third portion of said plurality of light-emitting members are arranged in a circle.

* * * * *